(12) United States Patent
Li et al.

(10) Patent No.: US 11,476,778 B2
(45) Date of Patent: Oct. 18, 2022

(54) RATIONAL NANO-COULOMB IONIZATION

(71) Applicant: Georgia Tech Research Corporation, Atlanta, GA (US)

(72) Inventors: Anyin Li, Atlanta, GA (US); Facundo Martin Fernandez, Atlanta, GA (US); Yunlong Zi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 394 days.

(21) Appl. No.: 16/645,269

(22) PCT Filed: Sep. 12, 2017

(86) PCT No.: PCT/US2017/051086
§ 371 (c)(1),
(2) Date: Mar. 6, 2020

(87) PCT Pub. No.: WO2018/049370
PCT Pub. Date: Mar. 15, 2018

(65) Prior Publication Data
US 2020/0266045 A1    Aug. 20, 2020

Related U.S. Application Data

(60) Provisional application No. 62/393,431, filed on Sep. 12, 2016.

(51) Int. Cl.
*H01J 49/16* (2006.01)
*H02N 1/00* (2006.01)
(Continued)

(52) U.S. Cl.
CPC ............ *H02N 1/004* (2013.01); *H01J 49/10* (2013.01); *H01J 49/165* (2013.01);
(Continued)

(58) Field of Classification Search
CPC .......... H01J 49/10; H01J 49/16; H01J 49/168; H01J 49/26; H02N 1/004; H02N 1/04–10
See application file for complete search history.

(56) References Cited

U.S. PATENT DOCUMENTS

| 9,178,446 B2 | 11/2015 | Wang et al. |
| 9,543,860 B2 | 1/2017 | Wang et al. |

(Continued)

FOREIGN PATENT DOCUMENTS

| WO | WO-2006129592 A1 * | 12/2006 | ............. A45D 20/12 |
| WO | WO-2017033959 A1 * | 3/2017 | ............. H01J 49/145 |

*Primary Examiner* — Eliza W Osenbaugh-Stewart
(74) *Attorney, Agent, or Firm* — Bryan W. Bockhop; Bockhop Intellectual Property Law, LLC

(57) ABSTRACT

An ion pulse generator (100) includes a triboelectric generator (110), an ion emitter (132) and a conductive surface (134). The triboelectric generator (110) includes a first electrode (114), a spaced apart second electrode (120) and a first triboelectric layer (116). The triboelectric generator (110) generates a predetermined amount of charge as a result of relative movement of the first triboelectric layer (116). The ion emitter (132) is electrically coupled to the first electrode (114). The conductive surface (134) is electrically coupled to the second electrode (120) and is spaced apart from the ion emitter (132) at a predetermined distance. Generation of the predetermined amount of charge causes formation of ions between the ion emitter (132) and the conductive surface (134).

8 Claims, 4 Drawing Sheets

(51) Int. Cl.
*H01J 49/10* (2006.01)
*H01J 49/26* (2006.01)

(52) U.S. Cl.
CPC .......... *H01J 49/167* (2013.01); *H01J 49/168* (2013.01); *H01J 49/26* (2013.01)

(56) References Cited

U.S. PATENT DOCUMENTS

| | | |
|---|---|---|
| 9,571,009 B2 | 2/2017 | Wang et al. |
| 9,595,894 B2 | 3/2017 | Wang et al. |
| 2009/0206247 A1 | 8/2009 | Sewell et al. |
| 2012/0280141 A1 | 11/2012 | Kovtoun et al. |
| 2014/0078637 A1* | 3/2014 | Robinson ............... B65H 16/00 361/220 |
| 2014/0292138 A1 | 10/2014 | Wang et al. |
| 2016/0070392 A1 | 3/2016 | Wang et al. |

* cited by examiner

RATIONAL NANO-COULOMB IONIZATION

CROSS-REFERENCE TO RELATED APPLICATION(S)

This application claims the benefit of U.S. Provisional Patent Application Ser. No. 62/393,431, filed Sep. 12, 2016, the entirety of which is hereby incorporated herein by reference.

STATEMENT OF GOVERNMENT INTEREST

This invention was made with government support under agreement No. DE-FG02-07ER46394, awarded by the Department of Energy, and under agreement Nos. 1504217 and 1505319, awarded by the National Science Foundation. The government has certain rights in the invention.

BACKGROUND OF THE INVENTION

1. Field of the Invention

The present invention relates to mass spectrometry devices and, more specifically, to an ion pulse generator used in mass spectrometry.

2. Description of the Related Art

Due to its high sensitivity and molecular specificity, mass spectrometry (MS) is a key analytical tool with applications in biomedicine, food science, homeland security, systems biology, drug discovery and other fields. In mass spectrometry a substance to be analyzed is gasified and ionized. The ions are accelerated into a magnetic field, which causes deflection of the ions. A detector detects the ions and determines the amount of deflection experienced by each ion. The amount of deflection of an ion is a function of its mass and, thus, by determining the amount of deflection, the ion can be identified by isotope.

The voltage applied to the ion source serves as one of the benchmark parameters for the process of converting neutrals into gas-phase ions prior to mass analysis. However, the number of generated ions does not depend on the applied voltage in a straightforward manner. As a result, controlling the number of charges used in the ionization of neutral samples is impractical with existing technology. Moreover, a large portion of the DC current—and therefore ions—is wasted due to the pulsed nature of ion trapping, time-of-flight (TOF), and ion mobility (IM)-MS experiments. As a result, ions are typically generated at currents ranging from nA to μA, but only pA-levels reach the mass analyzer. All these complications strongly affect sample utilization efficiency, limits of detection, quantitative performance, and duty cycle. Conventional high voltage (HV) power supplies used for powering ion sources also suffer from disadvantages such as high cost, limited portability, and safety concerns. Specialized electronic components such as HV switches and transformers are required in more elaborate electrospray ionization (ESI) modes driven by HV pulses, dielectric barrier polarization, or capacitive induction. The recent demonstration that charge pulses can trigger electrospray ionization has opened the possibility of developing simpler and more robust devices with fine and reproducible control of the ionization process.

Triboelectric nanogenerators (TENGs) are sustainable power sources that convert mechanical motion into electricity. Integrated into self-powered systems, TENGs have shown great potential in biomedical science and personal electronics. Based on triboelectrification and electrostatic induction, TENGs generate electric energy through a fixed number of charges that are proportional to the surface area of the functional material, typically in the tens to hundreds of μC m-2 per cycle. This quantized charge generation in the nC range is beyond the reach of conventional power supplies, and may provide a simple solution for charge-resolved ion generation in mass-to-charge or ion mobility-based analysis.

Therefore, there is a need for a ion pulse generator that employs a triboelectric nanogenerator to control the number of charges used in the ionization of neutral samples.

SUMMARY OF THE INVENTION

The disadvantages of the prior art are overcome by the present invention which, in one aspect, is an ion pulse generator that includes a triboelectric generator, an ion emitter and a conductive surface. The triboelectric generator includes a first electrode, a spaced apart second electrode and a first triboelectric layer. The triboelectric generator is configured to generate a predetermined amount of charge as a result of relative movement of the first triboelectric layer. The ion emitter is electrically coupled to the first electrode. The conductive surface is electrically coupled to the second electrode and is spaced apart from the ion emitter at a predetermined distance. Generation of the predetermined amount of charge causes formation of ions between the ion emitter and the conductive surface.

In another aspect, the invention is a mass spectrometry ionizing system that includes a triboelectric ion pulse generator, a magnetic field generator and a detector. The triboelectric ion pulse generator generates ions from gaseous material. The magnetic field generator generates a magnetic through which the ions travel and deflects the ions by an amount that is a function of mass. The detector detects the ions that have been deflected by the magnetic field and determines an amount of deflection experienced by each ion.

In yet another aspect, the invention is a method for generating ion pulses, in which a first triboelectric member in a triboelectric ion pulse generator is moved by a predetermined amount, thereby causing a fixed number of charges to move from a first electrode in the triboelectric ion pulse generator to a second electrode in the triboelectric ion pulse generator. A gaseous substance is driven through a gap. The fixed number of charges is passed across the gap thereby ionizing selected atoms in the gaseous substance.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
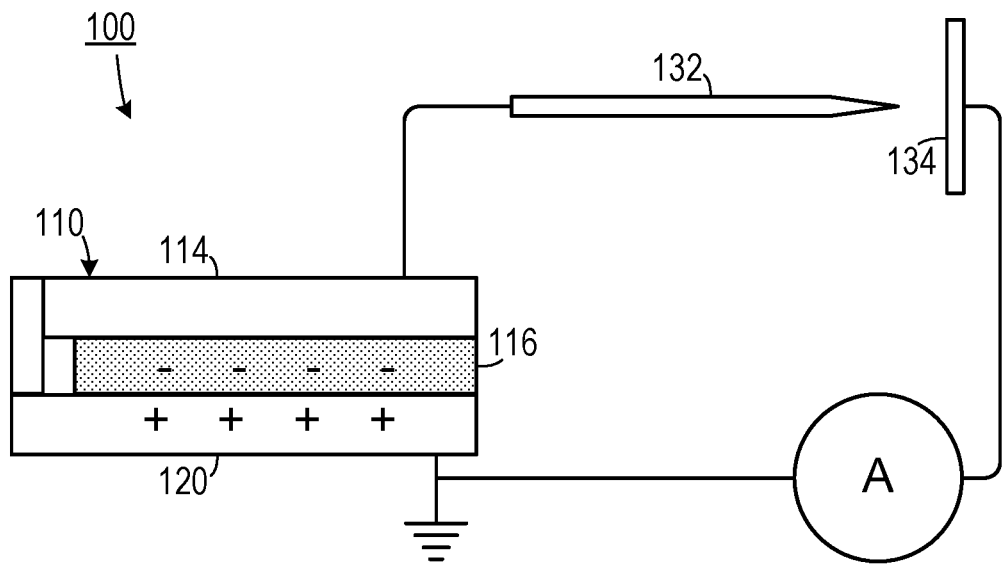
FIGS. 1A and 1B are schematic diagrams showing operation of an ion pulse generator employing a contact mode triboelectric generator.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

U.S. Pat. Nos. 9,178,446, 9,595,894, 9,571,009, and 9,543,860 disclose triboelectric generators and methods for making triboelectric generators, and are incorporated herein by reference for the purpose of disclosing the same.

As shown in FIG. 1, one embodiment of an ion pulse generator 100 includes a contact/separation-mode triboelectric generator 110. The contact/separation-mode triboelectric generator 110 includes a first electrode 114 that is coupled to a triboelectric layer 116. A second electrode 120 is disposed adjacent to the triboelectric layer 116. The second electrode 120 should be made from a material that has a different position on a triboelectric series from the position from the material from which the triboelectric layer 116 is made so that contact between the two causes an exchange of electric charge from one to the other. In one embodiment, both the first electrode 114 and the second electrode 120 can include copper and the first triboelectric layer 116 can include fluorinated ethylene propylene. The material employed in the electrodes can include a conductive metal, a conductive polymer or one of many other conductive materials. The triboelectric layer material can include one of many dielectric materials, including: PDMS, PTFE, FEP ("Teflon"), PVC, polyimide and combinations thereof.

Either the triboelectric layer 116 or the second electrode 120, or both, can have a nanoscale texture applied thereto to increase the triboelectric effect. Such a nanoscale texture could include, for example, a plurality of nanoparticles applied to the second electrode 120 or a plurality of nanostructures grown from, or etched into, the triboelectric layer 116.

The ion pulse generator 100 also includes an ion emitter 132, such as a needle electrode, that is electrically coupled to the first electrode 114 and a conductive surface 134, such as a conductive plate, that is electrically coupled to the second electrode 120. The ion emitter 132 is spaced apart from the conductive surface 134 so as to form a gap through which a gas can pass so as to become ionized. As charge is driven from the ion emitter 132 towards the conductive surface 134, gaseous material in the gap between the two will ionize.

Figure 1B:
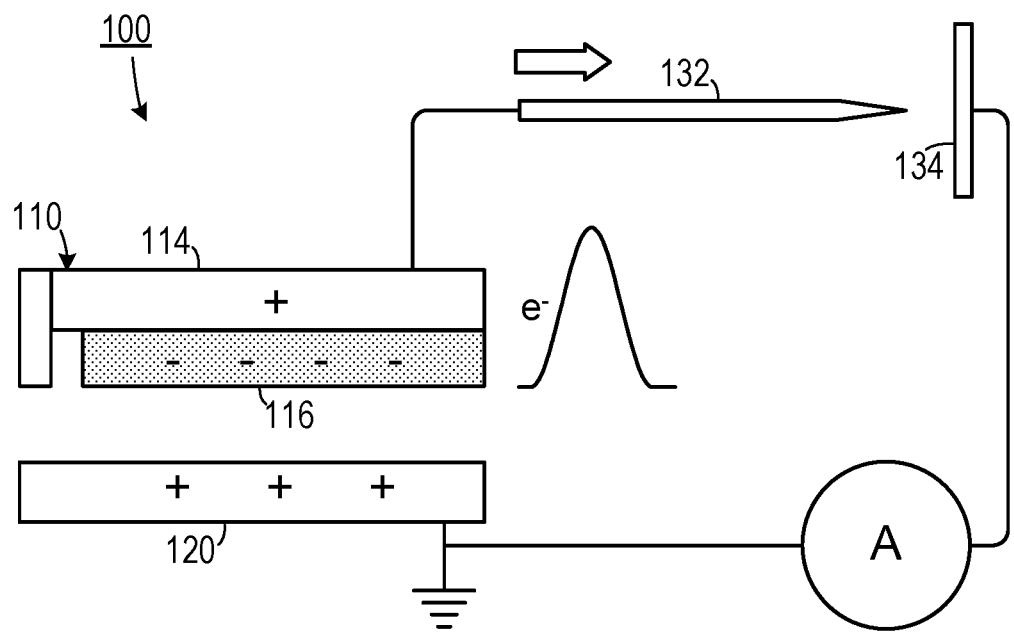

In operation, the triboelectric layer 116 is initially in contact with the second electrode 120, as shown in FIG. 1A, which causes a charge transfer between the triboelectric layer 116 and the second electrode 120 due to their different triboelectric properties. When the first electrode 114 and the triboelectric layer 116 are separated from the second electrode 120, as shown in FIG. 1B, the triboelectric layer 116, which has dielectric properties, retains the transferred charge. This charge must be balanced in the first electrode 114, which causes a charge transfer to the second electrode 120, thus causing a controlled current pulse to flow from the ion emitter 132 across the gap to the conductive surface 134.

Figure 2:
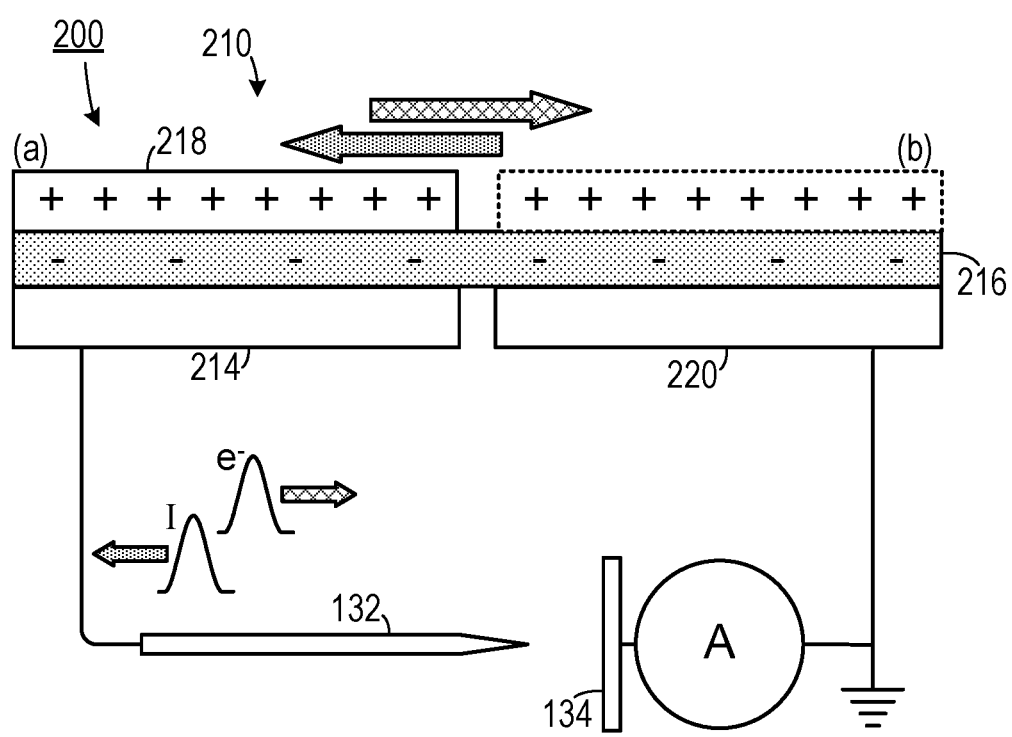
FIG. 2 is a schematic diagram of an ion pulse generator employing a sliding mode triboelectric generator.

As shown in FIG. 2, one embodiment of an ion pulse generator 200 includes a sliding-mode triboelectric generator 210. The sliding-mode triboelectric generator 210 includes a first triboelectric layer 216 upon a first side of which is disposed a second triboelectric layer 218.

A first electrode 214 and a second electrode 220 are disposed on a second side of the first triboelectric layer 216. The first triboelectric layer 216 can include fluorinated ethylene propylene and the second triboelectric layer 218 can include copper. In this embodiment, both the first electrode 214 and the second electrode 220 can include copper. The second triboelectric layer slides between a first position (a) that is aligned with the first electrode 214 and a second position (b) that is aligned with the second electrode 220.

Contact between the first triboelectric layer 216 and the second triboelectric layer 218 results in a charge transfer between the two. Since the second triboelectric layer 218 has a smaller area than the first triboelectric layer 216, it has a greater charge density. This causes the electrode under the second triboelectric layer 218 at any given time to have a greater affinity for opposite charges than the other electrode. As a result, charge flows from one electrode to the other to balance the charges. Because the second triboelectric layer 218 can slide in both directions, this embodiment can generate alternating charge pulses during the two opposite sliding cycles.

Figure 3:
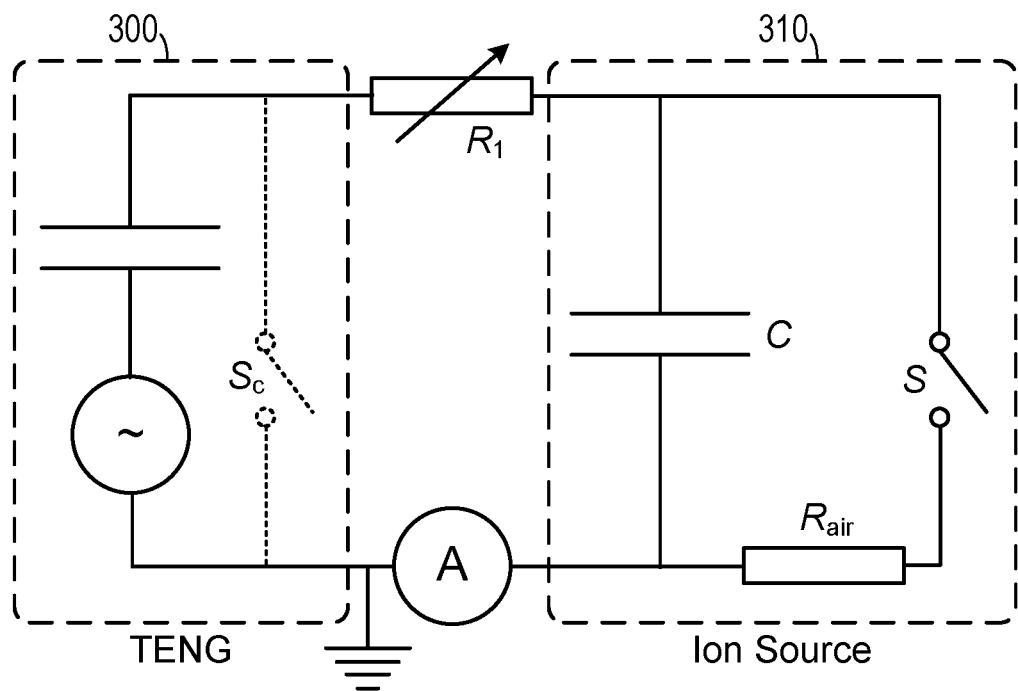
FIG. 3 is an equivalent circuit that models an ion pulse generator.

As shown in FIG. 3, an equivalent circuit can 0 represent the system in electronic terms. In this circuit, the triboelectric nanogenerator (TENG) 300 is modeled as a capacitor and a voltage source as shown within the left dashed rectangle. A nanoelectrospray ionization (nanoESI) emitter 310 is equivalent to a capacitor (C) that would leak (S) after reaching an onset charge value, shown within the right dashed rectangle. The leaked charges (i.e. generated ions) fly through the air gap ($R_{air}$) between the emitter and the mass spectrometer or picoamperemeter. Note that the CS-TENG electrodes are extended on the side to reset the electrostatic status at the contact position, represented as switch SC in broken lines.

Figure 4:
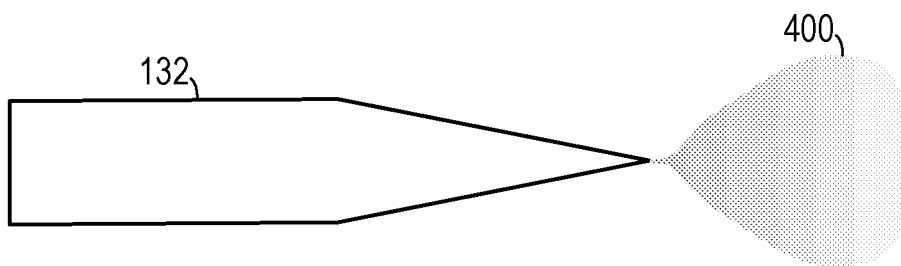
FIG. 4 is a schematic diagram of a needle electrode generating an electrospray pulse.

As shown in FIG. 4, the charge flow can induce ionization events such as the electrospray plumes 400.

Figure 5:
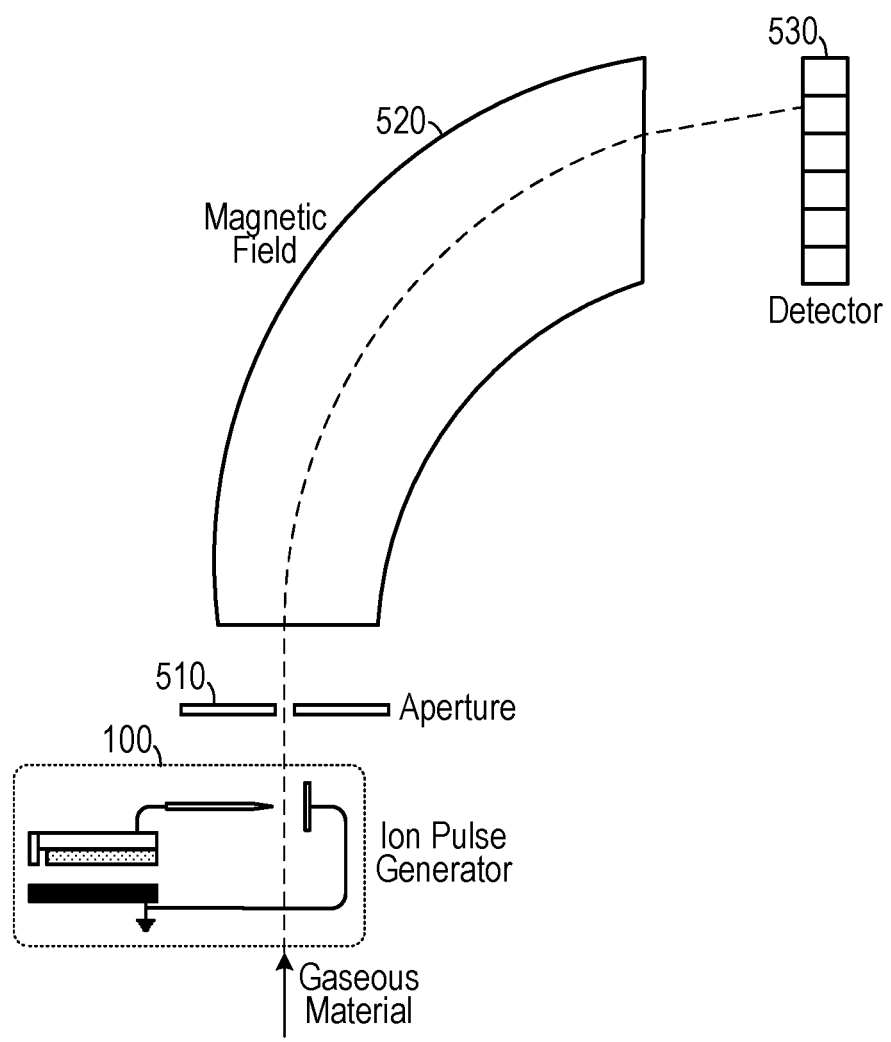
FIG. 5 is a schematic diagram of a mass spectrometer.

As shown in FIG. 5, a mass spectrometry ionizing system, can include a triboelectric ion pulse generator 100 of the type disclosed above. A gaseous material passing through the gap is ionized by the triboelectric ion pulse generator 100 and focused by an aperture 510 and accelerated into a magnetic field generated by a magnetic field generator 520. The magnetic field causes deflection of the ions, which are thus deflected into a detector 530, which determines the amount of deflection experienced by each ion as a result of where the ion impinges on the detector 530.

One experimental embodiment of a TENG-driven ion sources for mass spectrometric analysis achieved both nanoESI and plasma discharge ionization. The fixed number of charges provided by TENGs offered precise control over ion generation. With a rationalized physics model, controllable ion generation with nC accuracy was demonstrated. The duration, frequency, and polarity of generated ion pulses were all controllable via TENG actuation on-demand, with minimum sample consumption. The high voltage (5-9 kV) of TENG provided nanoESI with enhanced sensitivity at low concentrations, while the small number of charges in each ion pulse maximized sample utilization. A wide range of chemical compounds, ranging from small organic molecules, such as explosives and chemical warfare simulants, to large biomolecules were all successfully investigated by TENG MS. Alternating polarity electrospray pulses triggered by TENG were also demonstrated to deposit materials in patterns onto both conductive and insulating surfaces.

In this embodiment, the TENGs included two electrodes and at least one pair of triboelectric layers. The mechanical movement of these layers respect to each other breaks the original electrostatic balance and induces charge redistribution in the electrodes, leading to charge output through the connected external circuit.

Besides controlling the amount of charge available for ionization, mechanically-driven TENGs can also control the duration, polarity, and frequency of the downstream ionic signal. With a contact/separation TENG (CS-TENG), all charges are generated simultaneously at the transient moment when the two triboelectric layers separate. As a result, the generated nanoESI pulse duration was determined by the available charges above the onset voltage, which can be varied by changing the device dimensions. In comparison, sliding mode, or sliding friction, TENGs (SF-TENGs) generate charges progressively as the two surfaces slide. This feature can be utilized to achieve either longer spray pulses by slow sliding motion, or shorter spray pulses by rapidly switching the direction of the sliding motion before the available charges were consumed by the spray.

In one experimental embodiment, spray pulses ranging from >5 s per spray to <75 ms per spray were recorded by the mass spectrometer. When the frequency of the spray pulses was faster than the sampling interval (75 ms) of the mass spectrometer, a pseudo continuous total ion chronogram (TIC) was observed. A salient feature of SF-TENG is the generation of alternating polarity spray pulses, which is an established strategy for increasing analyte coverage in both ultrahigh performance liquid chromatography (UHPLC)-MS analysis27 and MS imaging. When single polarity spray pulses were desired from an SF-TENG, a diode bridge can be implemented.

In all cases, pulsed electrospray ion signals were generated with high reproducibility due to the discrete amount of charge output by the TENG. In a typical experiment where the mass spectrometer sampling frequency is higher than that of the pulse generation, the relative standard deviation (RSD) of the total ion chronogram (TIC) signals was only 3%. At micromolar concentrations, various analytes were ionized by TENG-nanoESI MS with sensitivity similar to that obtained using conventional nanoESI. However, as concentrations approached the limits of detection (LOD), TENG-nanoESI outperformed standard nanoESI. For example, when analyzing a 10 pg mL-1 cocaine sample under parallel reaction monitoring mode (PRM, m/z=182 as the precursor ion), standard DC (1-2 kV) nanoESI did not generate any detectable signature fragment ions. In comparison, SF-TENG (VOC 5-9 kV) nanoESI produced a detectable signal at the same concentration level, using the same nanoESI emitter. If the CS-TENG (VOC 1.6 kV) was used, no fragment ion signal was observed. This sensitivity enhancement is believed to be a result of the higher (5-9 kV) VOC of the SF-TENG as compared to CS-TENG and standard nanoESI.

Enabled by the high TENG output voltage, the system can demonstrate ion generation by discrete amount of charges. Both electrospray ionization and plasma discharge ionization have been demonstrated. Precise control over the ionization process was achieved with quantized ion pulses of adjustable duration, polarity, and frequency. This allows for using charge numbers as a new parameter, in addition to sample concentration, flow rate, etc. for quantitative MS analysis. These capabilities provide new avenues for addressing future challenges in chemical and biochemical detection. TENG-driven ionization represents a simple, safe, and effective approach, opening the possibility for accurate and efficient charge-resolved ionization.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A mass spectrometry ionizing system, comprising:

(a) a triboelectric ion pulse generator that generates ions from gaseous material;

(b) a magnetic field generator that generates a magnetic through which the ions travel and deflects the ions by an amount that is a function of mass; and (c) a detector that detects the ions that have been deflected by the magnetic field and determines an amount of deflection experienced by each ion.

2. The mass spectrometry ionizing system of claim 1, wherein the triboelectric ion pulse generator comprises:

(a) a triboelectric generator, including a first electrode, a spaced apart second electrode and a first triboelectric layer, that is configured to generate a predetermined amount of charge as a result of relative movement of the first triboelectric layer;

(b) an ion emitter electrically coupled to the first electrode; and (c) a conductive surface electrically coupled to the second electrode and spaced apart from the ion emitter at a predetermined distance, wherein generation of the predetermined amount of charge causes formation of ions between the ion emitter and the conductive surface.

3. The mass spectrometry ionizing system of claim 2, wherein the triboelectric generator comprises a contact/separation-mode triboelectric generator, wherein in the contact/separation-mode triboelectric generator, the first electrode is coupled to the triboelectric layer and wherein triboelectric layer is initially in contact with the second electrode and wherein the relative movement of the first triboelectric layer comprises separating the first electrode and the triboelectric layer from the second electrode so as to form a gap there between.

4. The mass spectrometry ionizing system of claim 3, wherein at least one of the first electrode and the second electrode comprises copper and wherein the first triboelectric layer comprises fluorinated ethylene propylene.

5. The mass spectrometry ionizing system of claim 2, wherein the triboelectric generator comprises a sliding-mode triboelectric generator, wherein the sliding-mode triboelectric generator further comprises a second triboelectric layer that is disposed on a first side of the first triboelectric layer and is contact therewith, the first electrode disposed on a second side of the first triboelectric layer, opposite from the first side, and the second electrode disposed on the second side of the first triboelectric layer and spaced apart from the first electrode, the second triboelectric layer configured to slide between a first position that is aligned with the first electrode and a second position that is aligned with the second electrode.

6. The mass spectrometry ionizing system of claim 5, wherein at least one of the first electrode and the second electrode comprises copper, wherein the first triboelectric layer comprises fluorinated ethylene propylene and wherein the second triboelectric layer comprises copper.

7. The mass spectrometry ionizing system of claim 2, wherein the ion emitter comprises a needle electrode.

8. The mass spectrometry ionizing system of claim 2, wherein the first triboelectric layer has a nanoscale texture applied thereto.

\* \* \* \* \*